United States Patent Office 2,813,725
Patented Nov. 19, 1957

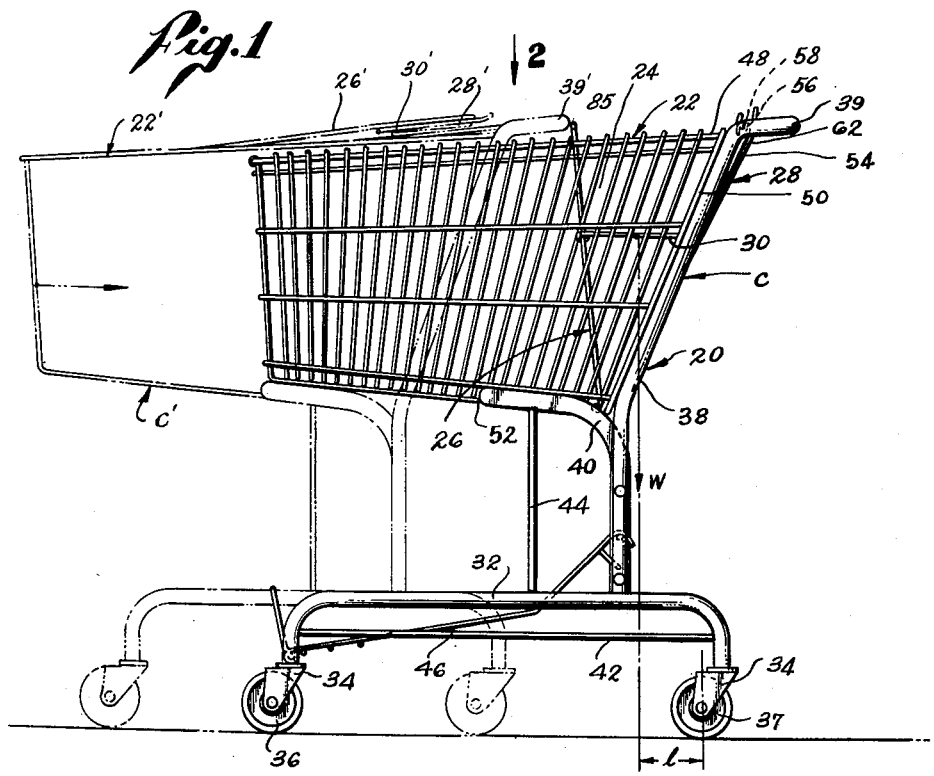
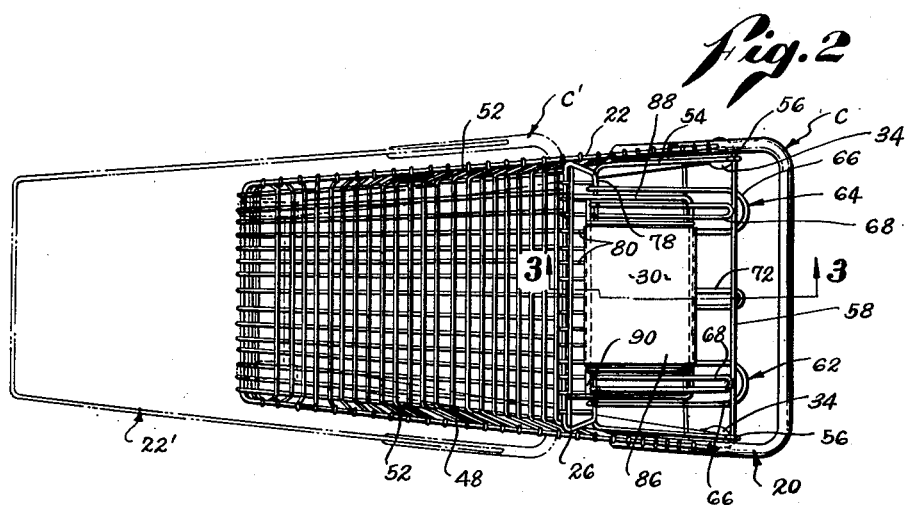
INVENTORS
GEORGE E. HOEDINGHAUS
RALPH G. SANDERS
HARROLD ULMER
BY Fulwider Mattingly, & Babcock
Attorneys

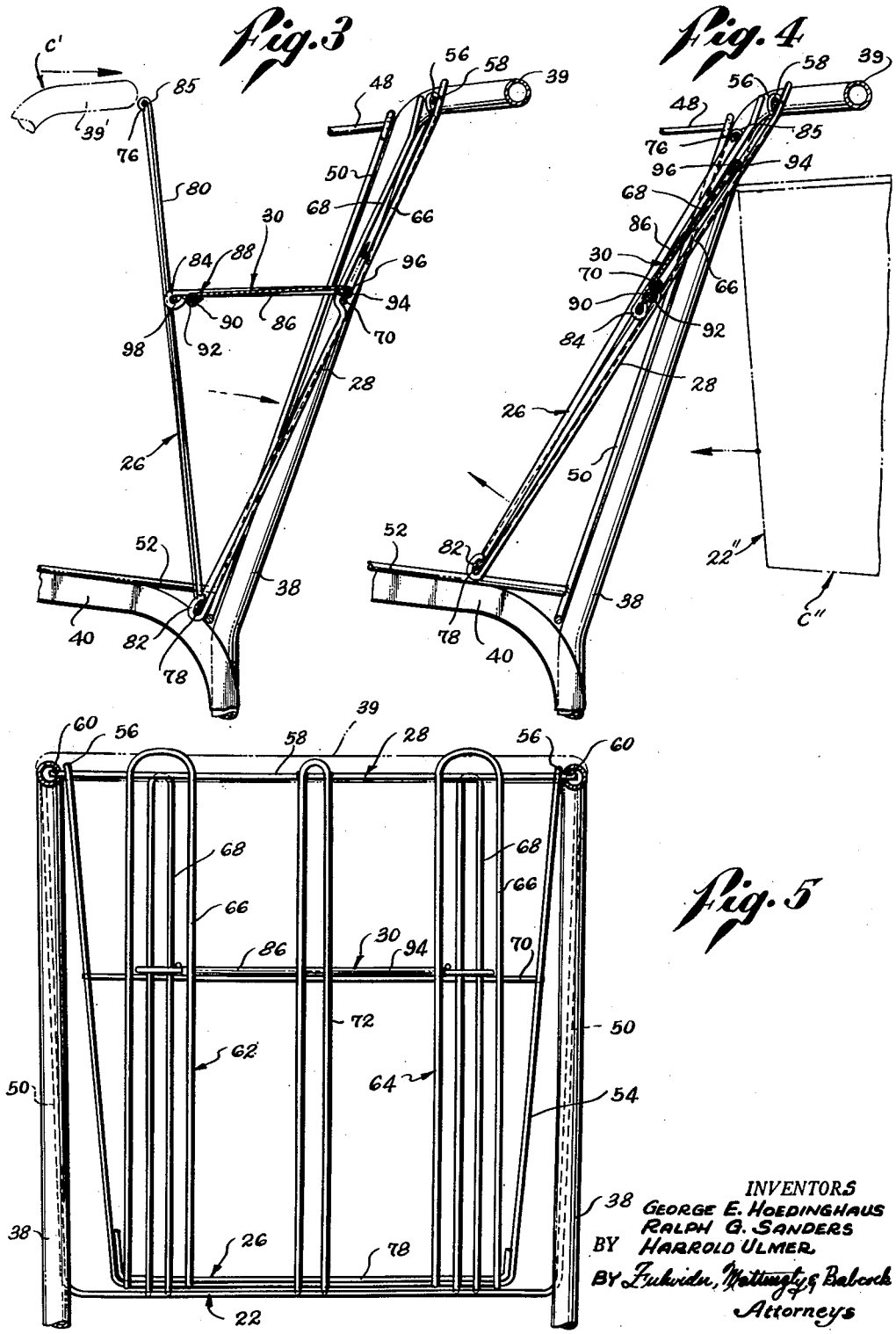

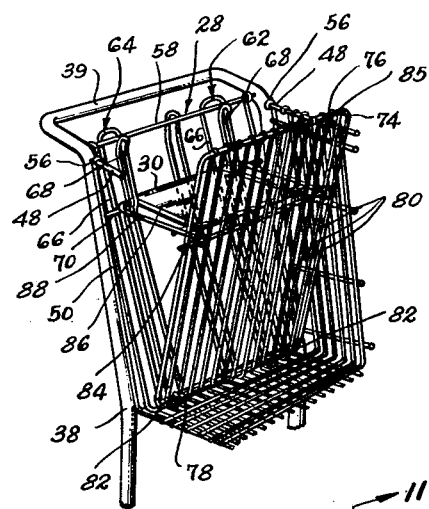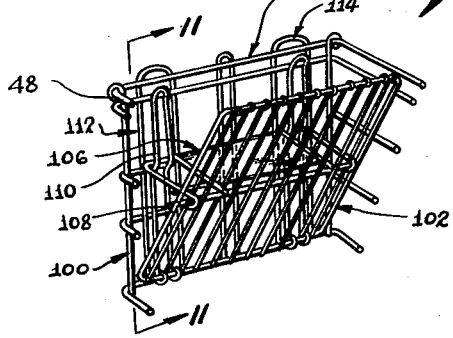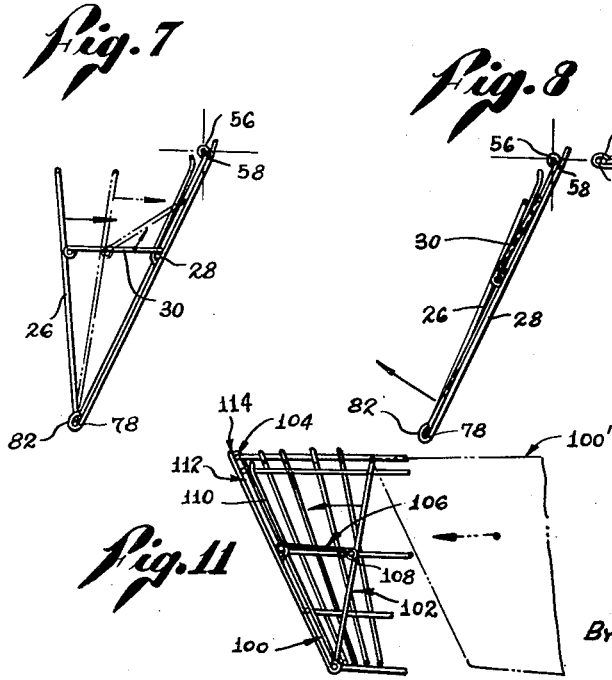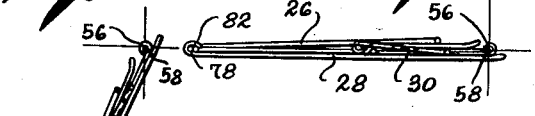

2,813,725

NESTING MARKET CART WITH CHILD'S SEAT

George E. Hoedinghaus, Burbank, Ralph G. Sanders, Glendale, and Harrold Ulmer, Sun Valley, Calif., assignors to Technibilt Corporation, Glendale, Calif., a corporation of California Application February 12, 1953, Serial No. 336,524

17 Claims. (Cl. 280—33.99)

The present invention relates generally to an improved form of grocery cart, and more particularly to grocery carts provided with a novel seat for carrying children.

It has also been proposed to equip grocery carts with seating means for the grocery shopper's child in order that his shopping could be made even more convenient. Thus, the child may be placed in a seat formed upon the cart whereby he can ride on the cart as the shopper makes his purchases. In this manner, the child can be effectively tended without requiring the constant attention of the shopper. Additionally, the child generally derives considerable pleasure from the feeling of motion as he is wheeled about the market whereby he exerts less of a distracting influence upon the shopper.

While the majority of the grocery carts equipped with a child's seat as heretofore devised have not embodied a nesting construction, certain nestable carts having a child's seat have been introduced. These latter carts, however, have not met with wide acceptance for a variety of reasons. The chief among such reasons is the failure of these grocery carts to meet the local health regulations; such failure resulting from the positioning of the child-supporting seat at a location where, upon inadvertent urination by the child, contamination of the grocery-receiving portion of the cart and/or the groceries disposed therein can occur. Another reason such grocery carts have failed to meet with wide acceptance has resulted from their lack of stability when a child is being carried thereon. Because of such instability, sudden movement of the child is quite liable to cause the grocery cart to be overturned, resulting in possible injury to the child as well as damage to the groceries disposed within the cart. Yet another reason such grocery carts have not been widely accepted is the difficulty encountered in shipping them to the grocery stores and markets where they are to be used and in re-assembling them after they have been received.

It is a major object of the present invention to provide a novel and improved grocery cart of the nestable type which incorporates a child-supporting seat.

Another object of the invention is to provide a grocery cart of this nature wherein the child-supporting seat is so located that upon urination by the child the grocery-receiving portion of the cart and any groceries therein will not be contaminated.

It is a further object of the invention to provide a grocery cart of the aforedescribed nature which is extremely stable under all conditions whereby it will not easily be overturned.

Another object of the invention is to provide a grocery cart wherein the child-supporting seat will be automatically collapsed when the cart is caused to nest within another cart.

Yet another object of the invention is to provide a grocery cart wherein the child is supported in such a manner that it cannot readily reach into the grocery-receiving portion of the cart.

It is a more particular object of the invention to provide a nestable grocery cart which is selectively usable with or without the child-supporting seat, and if used without such seat, its grocery carrying capacity is substantially the same as that of a conventional nestable grocery cart not equipped with a child-supporting seat.

Yet a further object of the invention is to provide a grocery cart which is simple of design and rugged of construction whereby it may have a long and trouble-free service life.

An additional object of the invention is to furnish a grocery cart of the aforedescribed nature having a child-supporting seat which may be located at either the front or the rear of the cart.

These and other objects and advantages of the present invention will become apparent from the following detailed description of two preferred embodiments thereof taken in conjunction with the appended drawings wherein:

Figure 1 is a side elevational view of a grocery cart embodying the present invention;

Figure 2 is a top plan view of said grocery cart;

Figure 3 is an enlarged vertical sectional view taken on lines 3—3 of Figure 2;

Figure 4 is an enlarged vertical sectional view similar to Figure 3 but showing the parts of the grocery cart as they appear when in a different position;

Figure 5 is an enlarged rear view of the grocery cart shown in Figures 1 through 4 with certain details eliminated in the interest of clarity;

Figure 6 is a reduced fragmentary perspective view of the grocery cart disclosed in the preceding figure and particularly showing the child-supporting seat thereof;

Figures 7, 8, and 9 are reduced fragmentary side elevational views of the grocery cart disclosed in Figures 1 through 6 showing the steps of operation followed in nesting said grocery cart;

Figure 10 is a reduced fragmentary perspective view showing a portion of a nestable grocery cart embodying an alternate form of child-supporting seat; and Figure 11 is a fragmentary vertical sectional view taken on line 11—11 of Figure 10.

Referring now to the drawings, and particularly to Figures 1 through 4 thereof, the preferred form of grocery cart C embodying the present invention comprises broadly a wheeled frame generally designated by the numeral 20, mounting an open-topped container or basket 22 defining a grocery-receiving compartment 24. The basket 22 has a movable rear end wall or support member 26 which cooperates with a fixed vertically disposed guide wall or gate member 28, to support therebetween a child-supporting seat, generally designated by the numeral 30. When the seat 30 is utilized to support a child (not shown), it is disposed in the substantially horizontal position indicated in Figures 1, 2, and 3. When, however, the grocery cart is to be used without the seat, the rear end wall 26 is collapsed against the front face of the fixed guide wall 28 with seat 30 being folded therebetween, as shown in Figure 4. It is also contemplated that the grocery cart be utilized in conjunction with other similar grocery carts whereby adjoining carts may be nested together when not in use, as indicated by the phantom line showing of another grocery cart C' in Figures 1, 2, and 3. In order to permit such nesting, it is necessary that the assembly comprising the folded-together walls 26 and 28, and the seat 30 be urged from its generally vertically extending position of Figure 4 to the generally horizontally extending position assumed by similar members of the cart C' in Figure 1, which latter members are given a primed designation in Figure 1.

More particularly, the frame 20 is preferably fabricated from tubular metallic elements welded, bolted, or otherwise rigidly joined together. The frame may include a pair of longitudinally extending base members 32 having downturned ends mounting rotatable castors 34 for a pair of front wheels 36 and rear wheels 37. It may also include an upstanding basket-supporting member 38 of generally inverted U-shaped configuration. Preferably, the top portion of the basket-supporting member 38 is sharply inclined rearwardly whereby it may constitute a handle 39 by means of which movement of the grocery cart by the shopper may be effected. The intermediate portion of the basket-supporting member 38 may mount a forwardly extending brace 40 for the bottom of the basket 22. Auxiliary bracing elements 42 and 44 may also be provided for interconnecting the ends of the base members 32, and the base members and the braces 40, respectively. Conveniently, an auxiliary grocery-supporting rack 46 is mounted between the base members 32.

The basket 22 is preferably constructed of rigidly interconnected wires defining an open-topped lattice work which permits ready identification of its contents. The basket tapers from its rear end in both plan and side elevation to facilitate nesting of the front portion of the basket of one cart within the rear portion of the basket of another cart. As shown in Figure 4, the topmost wire element 48 of the basket 22 may be generally U-shaped having its rear end secured to a basket-supporting member immediately forward of the handle 39. The vertical rear wire elements 50 of the basket may be disposed parallel to the adjacent portions of the basket-supporting frame member 38 and may have their upper ends looped about the rear ends of the top wire element 48 at this point. The bottom wire element 52 is also shown as being generally U-shaped and may have its rear ends rigidly connected as by welding to the lower portion of the rear wire elements 50.

The guide wall 28 is preferably of wire construction and is pivotally connected at its upper end to the upper portion of the basket-supporting frame member 38. For this purpose, referring to Figures 3, 4, and 5, the guide wall or gate member is seen to include a generally U-shaped outer element 54 formed at its opposite ends with integral loops 56. These loops 56 encircle a horizontal pivot rod 58 having its opposite ends rotatably disposed within aligned bores 60 formed in the basket-supporting frame member 38 adjacent the handle 39. The loops 56 may be rigidly affixed to the pivot rod 58, as by welding. The guide wall preferably includes a pair of transversely spaced vertical guiding members 62 and 64. Each of these guiding members will preferably be formed of wire and include an outer, generally U-shaped, element 66 rigidly secured as by welding at its upper portion to the rear of the pivot rod 58 and at its lower portion to the rear of the horizontal portion and outer element 54; and a narrower inner, generally U-shaped, element 68 secured between the legs of the outer element 66. The lower ends of the inner element 68 are seen to be rigidly secured as by welding to the front of the outer guide member element 54 and the intermediate portions thereof are shown rigidly secured to the front of a cross-piece 70 which interconnects the side legs of the outer guide wall element 54. These inner elements are not flat, but instead they are bent forwardly at a point adjacent the cross-piece 70, from which point they extend generally parallel to the guide wall. The guide wall 28 may also include a centrally disposed spacer 72 which is rigidly secured to the rear of the pivot rod 58, cross-piece 70 and the outer guide wall element 54, as by welding.

The rear end wall or support member 26 of the basket 22 may comprise a single outer wire 74 of a generally trapezoidal configuration, the top and bottom transverse elements 76 and 78 respectively thereof being rigidly interconnected by vertical elements 80. The bottom transverse element 78 is shown pivotally connected to the bottom of the guide wall 28. Conveniently, such connection is effected by forming the lower ends of the inner guiding members 68 with integral loops 82. The intermediate portion of the rear end wall 26 rigidly mounts a transverse support element 84. The upper end of the wall 26 is free. It should be particularly noted that the rear end wall is of sufficient length that its uppermost portion 85 extends above the side walls of the basket 22, as clearly shown in Figure 1.

The child-supporting seat 30 may comprise a flat plate 86, a generally U-shaped mounting element 88, and a transverse brace 90, which brace rigidly interconnects the legs of the mounting element 88. The front and rear ends of the plate 86 are formed into loops 92 and 94, respectively, for receiving the brace 90 and the transverse leg 96 of the mounting element 88. The front end of the seat 30 is shown pivotally connected to the transverse support element 84 of the rear end wall 26 by means of integral loops 98 formed upon the ends of the mounting element 88. The opposite end of this seat is shown as having a slidable engagement with the inner elements 68 of the two guiding members 62 and 64. To this end, the plate 86 may be shorter in length than the transverse leg 96 of the mounting element 88 whereby will be defined a transverse space between each of the sides of the plate and the legs of the mounting element. The inner elements 68 of the guiding members 62 and 64 are shown disposed within these transverse spaces. This arrangement is clearly disclosed in Figures 5 and 6, and with respect to Figure 5 it should be observed that the major portion of the rear end wall 26, as well as the front end wall 100 of the basket 22, have been omitted in the interests of clarity.

When a grocery cart constructed in accordance with the preceding description is to be utilized by a shopper accompanied by a child, the rear end wall 26, guide wall 28, and seat 30 are disposed in the position shown in Figures 1, 2, 3, 5, and 6. The child may then be placed upon the seat plate 86 with his back resting against the rear of the end wall 26 and with his right leg inserted within the open area defined between the guiding member 62 and the spacer 72, and his left leg inserted within the open area defined between the guiding member 64 and the spacer 72. With the child so positioned, it will be apparent that he will be restrained against other than minor squirming and twisting. Accordingly, he will not be able to unseat himself, nor will he have ready access to the contents of the basket 22. Additionally, the child will not be able to shift his weight more than a slight distance, and hence the danger of the grocery cart overturning is negligible. The danger of inadvertent overturning of the grocery cart is further reduced by the positioning of the center of the seat 30 longitudinally forward of the rear wheels 37. Thus, referring to Figure 1, it will be observed that the downward component of the center of the weight supported upon the seat (indicated by the vertical line W) will be disposed forward of the center of the rear wheels 37 by a horizontal distance L, even when the wheels are castored toward the front. Inasmuch as the child's weight will always be disposed between the axis of the wheels 36 and 37 the cart cannot easily be overturned rearwardly by the child. It will also be observed that positioning of the child's body rearwardly of the end wall 26 will prevent any contamination of the contents of the basket 22 should the child urinate. This is a very important feature since it enables the grocery cart to meet the rigid health and sanitation regulations of the various states, counties, and cities.

If the grocery cart is to be used without the seat 30, the upper portion of the rear end wall 26 may be pivoted in a clockwise direction about lower end of the guide wall 28, as shown in Figures 3 and 4, until its rear surface abuts the front surface of the guide wall. Substantially the entire grocery-receiving compartment 24 of the basket 22 will then be available for the reception of groceries. During rotation of the rear end wall from its position of Figure 3 to that of Figure 4, the seat 30 will be collapsed between the rear end wall and the guide wall. Thus, referring to Figure 3, as the rear end wall rotates rearwardly about its lower end, the seat pivots in a counter-clockwise direction about its front end; the rear end of the seat sliding upwardly relative to the guide wall. During such pivotal movement of the seat, the loops 98 of the front of the seat will rotate about the transverse support element 84 of the rear end wall, while the transverse leg 96 of the rear of the seat will be guided in its upward movement by virtue of the interposition of its end portions between the inner and outer elements, 68 and 66, respectively, of the guiding members 62 and 64.

With further reference to Figure 3, it is contemplated that the rear end wall 26 be automatically folded against the guide wall 28 whereby the seat 30 will be collapsed therebetween when the grocery card C is nested within another similar grocery cart C'. To this end, and as has been pointed out previously hereinbefore, the upper portion 85 of the rear end wall 26 projects above the side walls of the basket 22. With this arrangement, at such time as the front portion of the basket of the grocery cart C is urged into the rear portion of the basket of grocery cart C', or alternately the rear portion of the basket of grocery cart C' is urged about the front portion of the basket of grocery cart C, the handle 39' of the grocery cart C' will contact the upper portion of the rear end wall 26 of cart C. As indicated by the directional arrows in Figures 3 and 7, continued relative movement together of the carts C and C' after such contact will cause the rear end wall to be pivoted toward its folded position of Figures 4 and 8. Hence, the upper portion 85 constitutes a trigger means for effecting rearward movement of the end wall 26 toward the guide wall 28. If thereafter the front portion of the basket 22" of yet a third grocery cart C" shown in Figure 4 is caused to nest within the rear portion of the basket of the grocery cart C, contact of the front end of the basket 22" with the rear face of guide wall 28 will cause the entire assembly comprising the guide wall 28, seat 30 and the rear end wall 26 to be pivoted upwardly in a counter-clockwise direction, as indicated by the directional arrow of Figure 8, until this assembly reaches the position shown in Figure 9. It should be noted in Figure 1 that the comparable assembly of the grocery cart C' is shown disposed in this position. The assembly will be maintained in this position by the side walls of the nested basket until the adjoining grocery carts are again separated. Thus referring again to Figure 1, at such time as the grocery cart C is moved to the right relative to the grocery cart C', the folded-together rear end walls 26', guide wall 28', and seat 30' will be free to pivot counter-clockwise downwardly until the lower ends of the walls rest upon the bottom of the basket 22'. If the grocery cart is to be utilized without the seat, it will be ready for immediate use at this time. If the seat is to be used, however, the shopper need only pivot the top of the rear end wall forwardly relative to the guide wall to move the seat to its substantially horizontal child-supporting position.

Referring now to Figures 10 and 11, although it is preferable to locate the child-supporting seat at the rear of the grocery-receiving basket in most cases, it is also possible to form it at the front of such basket. In this case, the basket 100 may include a front end wall 102, a guide wall 104 and a seat 106, which members are essentially similar to the rear end walls 26, guide walls 28, and seat 30 described hereinbefore. It should be noted, however, that the guide wall 104 is mounted rigidly relative to the basket 100. In operation, referring to Figure 11, the front portion of the basket 100' of a similar grocery cart will be adapted to nest within the front portion of the basket 100. As shown by the directional arrows in this figure, at such time as the front end of the basket 100' contacts the rear face of the front end wall 102, the latter will be caused to pivot in a counter-clockwise direction forwardly against the guide wall 104; the seat 106 being collapsed therebetween during such movement. To this end, the rear of the seat 106 is pivotally connected to a transverse support element 108 of the front end wall 102 while the front end of the seat is slidably engaged with inner elements 110 of a pair of guiding members 112 and 114 formed on the guide wall 104.

When the grocery cart is again to be utilized, the cart having the basket 100' may be withdrawn to the right and the front end wall 102 and the seat 106 will be found disposed against the rear of the guide wall 104. If the shopper does not wish to utilize the seat 106, the grocery cart will be ready for immediate use. If the seat is to be utilized, however, it is only necessary to pivot the portion of the front end wall 102 in a clockwise direction rearwardly to the position of Figures 10 and 11 whereby the seat 106 will be moved to the substantially horizontal child-supporting position shown in these two figures.

Although there has been described hereinbefore a preferred and a modified embodiment of the present invention, it will be apparent that various modifications and changes may be made with respect thereto. For example, although the child-supporting seat 30 in Figures 1 through 9 has been shown as being pivotally connected to the rear end wall 26 and slidably carried by the guide wall 28, it will be apparent that it can also be pivotally connected to the guide wall and slidably carried by the rear end wall without substantially affecting the operation of the device. Additionally, although the grocery cart embodying the present invention has been shown formed with a single child-supporting seat at either its rear or front ends, it may be formed with such seats at both its front and its rear end. However, all such modifications and changes fall within the spirit of the invention and scope of the appended claims.

We claim:

1. A grocery cart, comprising: a frame; a container defining a grocery-receiving compartment mounted by said frame; a wall member for said container; a gate member mounted by said frame; means connecting the lower ends of said members whereby the upper end of said wall member may be moved away from the center of said compartment until it lies against said gate member; a child-supporting seat pivotally connected at one of its ends to one of said members and having its opposite end slidably engaged with the other member; and stop means formed on one of said members engageable by said seat when it is disposed in a substantially horizontal position whereby said members and said stop means will maintain said seat in a substantially horizontal position when their upper ends are in spaced-apart relationship and movement of said wall member toward said gate member will cause said seat to be collapsed therebetween.

2. A grocery cart, comprising: a frame; a container defining a grocery-receiving compartment mounted by said frame; an end wall for said container; a guide wall mounted by said frame and including a pair of transversely-spaced vertically extending guiding members and a centrally located spacer; means pivotally interconnecting the lower ends of said walls whereby the upper end of said end wall may be pivoted away from the center of said compartment until it lies against said guide wall; and, a child-supporting seat pivotally connected at one of its ends to said end wall and having its opposite end slidably carried by said guiding members whereby said walls will maintain said seat in a substantially horizontal position when their upper ends are in spaced-apart relationship and movement of said end wall toward said guide wall will cause said seat to be collapsed therebetween, the open areas between said spacer and said guiding members defining leg-receiving apertures for a child disposed upon said seat when it is in said substantially horizontal position.

3. A grocery cart for use with a second similar grocery cart, comprising: a frame; a container defining a grocery-receiving compartment mounted by said frame; an end wall for said container; a guide wall disposed outwardly of said end wall; means connecting said walls whereby they may undergo relative movement toward and away from one another; means securing one of said walls to said container in order that said walls when in a moved-together relationship may be urged out of a vertically extending position to a nested position by a portion of said second cart thereby permitting said portion to nest within said container; a child-supporting seat pivotally connected at one of its ends to one of said walls and having its opposite end slidably engaged with the other wall; and stop means formed on said other wall engageable by said seat whereby said walls and said stop means will maintain said seat in a substantially horizontal position when they are in spaced-apart relationship and relative movement of said walls to a moved-together relationship will cause said seat to be collapsed therebetween.

4. A nestable grocery cart for use with other similar grocery carts, comprising: a frame; a container mounted by said frame and defining a grocery-receiving compartment; an end wall for said container; a guide wall disposed outwardly of said end wall; means connecting said walls to said container whereby they may undergo relative movement toward and away from one another; a child-supporting seat disposed between and having its ends supported by said walls in such a manner that said walls will maintain said seat in a substantially horizontal position when they are in spaced-apart relationship and relative movement of said walls toward one another will cause said seat to be collapsed therebetween; and, trigger means extending from one of said walls in a position to be engaged by another cart when said carts are being nested, such engagement causing said other cart to urge the wall from which said trigger means extends toward the other wall.

5. A nestable grocery cart for use with other similar grocery carts, comprising: a frame; a container mounted by said frame and defining a grocery-receiving compartment; an end wall for said container; a guide wall disposed outwardly of said end wall; means connecting said walls to one another and to said container whereby they may undergo relative movement toward and away from one another, and when disposed in a moved-together relationship they may be urged from a vertically extending position to a nested position by a second cart in order that a portion thereof may nest within said container; a child-supporting seat disposed between and having its ends supported by said walls in such a manner that said walls will maintain said seat in a substantially horizontal position when they are in spaced-apart relationship and relative movement of said walls toward one another will cause said seat to be collapsed therebetween; and, trigger means extending from one of said walls in a position to be engaged by yet another cart when said grocery cart is being nested in said other cart such engagement causing the wall from which said trigger means extends to move toward the other wall.

6. A grocery cart, comprising: a frame; a container defining a grocery-receiving compartment mounted by said frame; a rear end wall for said container; a guide wall disposed rearwardly of said end wall and pivotally connected at its upper end to said frame; means pivotally interconnecting the lower ends of said walls whereby the upper end of said end wall may be pivoted rearwardly from a forward position until it lies against the front of said guide wall, the upper portion of said end wall extending above the side walls of said container when it is in said forward position; and, a child-supporting seat disposed between and having its ends supported by said walls in such a manner that said walls will maintain said seat in a substantially horizontal position when said end wall is in said forward position and rearward movement of said end wall toward said guide wall will cause said seat to be collapsed therebetween, the assembly comprising said pivoted-together walls and said collapsed seat then being pivotable forwardly and upwardly relative to said frame.

7. A nestable grocery cart for use with other similar grocery carts, comprising: a frame; a container defining a grocery-receiving compartment mounted by said frame; a rear end wall for said container; a guide wall mounted rearwardly of said end wall by said frame; means pivotally interconnecting the lower ends of said walls whereby the upper portion of said end wall may be pivoted rearwardly from a forward location until said end wall lies against the front of said guide wall; trigger means formed on said end wall projecting outside the confines of the side walls of said container when it is in said forward location in position to be engaged by another cart when said grocery cart is being nested within said other cart so that such engagement will cause said end wall to be pivoted rearwardly; a child-supporting seat pivotally connected at one of its ends to one of said walls and having its opposite end slidably carried by the other wall; and stop means formed on said other wall engageable by said seat whereby said walls and said stop means will maintain said seat in a substantially horizontal position when said end wall is in said forward position and rearward movement of said end wall toward said guide wall will cause said seat to be collapsed therebetween.

8. A grocery cart, comprising: a frame; a container defining a grocery-receiving compartment mounted by said frame; a rear end wall for said container; a guide wall disposed rearwardly of said end wall and pivotally connected at its upper end to said frame; means pivotally interconnecting the lower ends of said walls whereby the upper end of said end wall may be pivoted rearwardly from a forward position until it lies against the front of said guide wall, the upper portion of said end wall extending above the side walls of said container when it is in said forward position; a child-supporting seat pivotally connected at one of its ends to one of said walls and having its opposite end slidably carried by the other of said walls; and stop means formed on said other wall engageable by said seat whereby said walls and said stop means will maintain said seat in a substantially horizontal position when said end wall is in said forward position and rearward movement of the upper end of said end wall toward said guide wall will cause said seat to collapse therebetween, the assembly comprising said pivoted-together walls and said collapsed seat then being pivotable forwardly and upwardly relative to said frame.

9. A grocery cart, comprising: a frame; a container defining a grocery-receiving compartment mounted by said frame; a rear end wall for said container; a guide wall disposed rearwardly of said end wall and pivotally connected at its upper end to said frame, said guide wall including a pair of transversely-spaced vertically extending guiding members and a centrally located spacer; means pivotally interconnecting the lower ends of said walls whereby the upper end of said end wall may be pivoted rearwardly from a forward position until it lies adjacent the front of said guide wall; and, a child-supporting seat pivotally connected at its front end to the intermediate portion of said end wall and having its rear end slidably carried by said guiding members whereby said walls will maintain said seat in a substantially horizontal position when said end wall is in said forward position and upon rearward movement of said end wall the rear end of said seat will slide upwardly along said guiding members to a collapsed position between said walls, the open areas between said spacer and said guiding members defining apertures for receiving the legs of a child disposed upon said seat when it is in said substantially horizontal position, and the assembly comprising said pivoted-together walls and collapsed seat being pivotable forwardly and upwardly relative to said frame.

10. A grocery cart, comprising: a frame; a container defining a grocery-receiving compartment mounted by said frame; a rear end wall for said container; a guide wall disposed rearwardly of said end wall and pivotally connected at its upper end to said frame, said guide wall including a pair of transversely-spaced vertically extending guiding members and a centrally located spacer; means pivotally interconnecting the lower ends of said walls whereby the upper end of said end wall may be pivoted rearwardly from a forward position until it lies adjacent the front of said guide wall, the upper portion of said end wall extending above the side walls of said container when it is in said forward position; and, a child-supporting seat pivotally connected at its front end to the intermediate portion of said end wall and having its rear end slidably connected to said guiding members whereby said walls will maintain said seat in a substantially horizontal position when said end wall is in said forward position and upon rearward movement of said end wall the rear end of said seat will slide upwardly along said guiding members to a collapsed position between said walls, the open areas between said spacer and said guiding members defining leg-receiving apertures for a child disposed upon said seat when it is in said substantially horizontal position, and the assembly comprising said pivoted-together walls and collapsed seat being pivotable forwardly and upwardly relative to said frame.

11. A grocery cart, comprising: a frame, including a base member mounting longitudinally-spaced front and rear wheels; a grocery-receiving container mounted by said frame; a rear end wall for said container; a guide wall disposed rearwardly of said end wall; means connecting said walls to said container whereby they may undergo relative movement toward and away from one another; a child-supporting seat having one of its ends pivotally connected to one of said walls and its opposite end slidably engaged with the other wall; and stop means formed on said other wall whereby said walls and said stop means will maintain said seat in a substantially horizontal position with its mid-portion lying between the axes of said front and rear wheels when said walls are in spaced-apart relationship and rearward movement of said end wall toward said guide wall will cause said seat to be collapsed therebetween.

12. A grocery cart, comprising: a frame, said frame including a base member mounting longitudinally-spaced front and rear wheels; an open-topped container mounted by said frame; a rear end wall for said container; a guide wall disposed rearwardly of said end wall and pivotally connected at its upper end to said frame, said guide wall including a pair of transversely-spaced vertically extending guiding members and a centrally located spacer; means pivotally interconnecting the lower ends of said walls whereby the upper end of said end wall may be pivoted rearwardly from a forward position until it lies adjacent the front of said guide wall, the upper portion of said end wall extending above the side walls of said container when it is in said forward position; and, a child-supporting seat pivotally connected at its front end to the intermediate portion of said end wall and having its rear end slidably carried by said guiding members whereby said walls will maintain said seat in a substantially horizontal position with its mid-portion lying between the axes of said front and rear wheels when said end wall is in said forward position and upon rearward movement of said end wall the rear end of said seat will slide upwardly along said guiding members to a collapsed position between said walls, the open areas between said spacer and said guiding members defining leg-receiving apertures for a child disposed upon said seat when it is in said substantially horizontal position, and the assembly comprising said pivoted-together walls and collapsed seat being pivotable forwardly and upwardly relative to said frame.

13. A grocery cart, comprising: a frame; an open-topped container mounted by said frame; a front end wall for said container; a guide wall rigidly mounted forwardly of said end wall and including a pair of transversely-spaced vertically extending guiding members and a centrally located spacer; means pivotally connecting the lower end of said end wall to said guide wall in order that said end wall may be pivoted toward and away from said guide wall; and, a child-supporting seat pivotally connected at its rear end to the intermediate portion of said end wall and having its front end slidably engaged with said guiding members whereby said walls will maintain said seat in a substantially horizontal position when said end wall is disposed with its upper end spaced rearwardly from said guide wall and upon forward movement of said end wall toward said guide wall the front end of said seat will slide upwardly along said guiding members to a collapsed position between said walls, the open areas between said spacer and said guiding members defining leg-receiving apertures for a child disposed upon said seat when it is in said substantially horizontal position.

14. An end gate for a nesting cart of the type described which includes: an end wall; a guide wall disposed outwardly from said end wall; means pivotally connecting the lower ends of said walls so that the upper ends thereof may be placed adjacent each other or spaced apart; means for pivotally connecting the upper end of said guide wall to said cart, whereby said guide wall and said end wall normally extend in a generally vertical direction, but may be swung upwardly to a generally horizontal position; a child-supporting seat disposed between said walls and pivotally connected at one edge to one of said walls, the opposite edge of said seat being slidable with respect to the other of said walls; and stop means formed on the other of said walls engageable by said seat whereby said walls and said stop means will maintain said seat in a substantially horizontal position when they are in spaced-apart relationship, and relative movement of said walls toward one another will cause said seat to be collapsed therebetween.

15. A grocery cart comprising: a frame; a grocery receiving compartment formed on said frame, a gate member mounted on said frame, a wall member for said compartment pivotally mounted on the lower end of said gate member to permit the upper ends of said members to be moved toward and away from one another; a child-supporting seat disposed between said members with one end of said seat pivotally connected to one of said members at a point intermediate the upper and lower ends of such member; means connected to the other of said members and engaging with said seat to support said seat in a generally horizontal position when the upper ends of said members are disposed away from one another and guide said seat to assume a position generally parallel to said members when said members are moved toward one another.

16. An end gate for a nesting cart of the type described which includes: a wall member; a gate member disposed outwardly from said wall member; means pivotally connecting the lower ends of said members so that the upper ends thereof may be placed adjacent each other or spaced apart; means for pivotally connecting the upper end of said gate member to the cart whereby said gate member and said wall member normally extend in a generally vertical direction but may be swung upwardly to a generally horizontal position; a child supporting seat disposed between said members and pivotally connected to one of said members; means conencting said seat to the other of said members to support said seat in a substantially horizontal position when said members are in spaced apart relationship and to guide movement of said seat when said members are moved toward one another to position said seat generally parallel with said members when they are adjacent one another.

17. A nestable grocery cart for use with other similar grocery carts, comprising: a frame; a container mounted by said frame defining a grocery-receiving compartment; a support member in said container; a gate member disposed outwardly of said support member; means connecting said members to said container whereby they may undergo relative movement toward and away from one another; a child-supporting seat disposed between and having one end pivotally supported by one of said members and the other end guidingly engaging the other of said members in such a manner that said members will maintain said seat in a substantially horizontal position when they are in spaced-apart relationship and relative movement of said members towards one another will cause said seat to be collapsed therebetween; the upper portion of one of said members being in a position to be engaged by another cart when said carts are being nested, such engagement causing said other cart to urge the members together.

References Cited in the file of this patent

UNITED STATES PATENTS

| | | |
|---|---|---|
| 1,965,048 | Morris | July 3, 1934 |
| 2,427,121 | Bohmer | Sept. 9, 1947 |
| 2,479,530 | Watson | Aug. 16, 1949 |
| 2,498,428 | Kruse | Feb. 21, 1950 |
| 2,508,670 | Goldman | May 23, 1950 |
| 2,223,958 | Laursen | Dec. 3, 1950 |
| 2,583,513 | Maslow | Jan. 22, 1952 |
| 2,662,775 | Goldman | Dec. 15, 1953 |
| 2,675,860 | Schroeder | Apr. 20, 1954 |
| 2,689,133 | Goldman | Sept. 14, 1954 |

OTHER REFERENCES

Pamphlet by Folding Carrier Corporation of Oklahoma City, Oklahoma, describing Baby Nester Nest Karts and advertising NAFC Convention on Sept. 23–26, 1951.